(12) United States Patent
Minefuji

(10) Patent No.: US 6,906,868 B2
(45) Date of Patent: Jun. 14, 2005

(54) ZOOM LENS SYSTEM

(75) Inventor: Nobutaka Minefuji, Saitama (JP)

(73) Assignee: PENTAX Corporation, Tokyo (JP)

(*) Notice: Subject to any disclaimer, the term of this patent is extended or adjusted under 35 U.S.C. 154(b) by 14 days.

(21) Appl. No.: 10/613,209

(22) Filed: Jul. 7, 2003

(65) Prior Publication Data

US 2004/0012859 A1 Jan. 22, 2004

(30) Foreign Application Priority Data

Jul. 17, 2002 (JP) ....................................... 2002-208509

(51) Int. Cl.$^7$ .......................................... G02B 15/177
(52) U.S. Cl. ...................................... 359/689; 359/682
(58) Field of Search .......................... 359/689, 680–682, 359/687, 691

(56) References Cited

U.S. PATENT DOCUMENTS 6,377,404 B1 * 4/2002 Goosey, Jr. .................. 359/682
2003/0072085 A1 * 4/2003 Mizuguchi et al. ......... 359/680

FOREIGN PATENT DOCUMENTS

| JP | 10206732 | 8/1998 |
| JP | 11211984 | 8/1999 |

OTHER PUBLICATIONS

English Language Translation of JP Appln. No. 10–206732.
English Language Translation of JP Appln. No. 11–211984.

* cited by examiner

Primary Examiner—Scott J. Sugarman
Assistant Examiner—Deborah Raizen
(74) Attorney, Agent, or Firm—Greenblum & Bernstein, P.L.C.

(57) ABSTRACT

A zoom lens system includes a negative first lens group, a positive second lens group, and a positive third lens group. The negative first lens group includes a negative meniscus lens element having the convex surface facing toward the object, and the positive third lens group includes a positive biconvex lens element. Upon zooming, at least the negative first lens group and the positive second lens group are moved. A diaphragm is provided on the object side of the positive second lens group, and moves integrally therewith. The zoom lens system satisfies the following conditions: $0.25 < R1/D1 < 0.55$ ... (1); $0.25 < f2/TL < 0.45$ ... (2) wherein R1: the radius of curvature of the image-side surface of the negative meniscus lens element; D1: the distance between the negative first lens group and the positive second lens group at the short focal length extremity; f2: the focal length of the positive second lens group; and TL: the distance from the most object-side surface the negative first lens group to the most image-side surface of the positive third lens group, at the short focal length extremity.

6 Claims, 14 Drawing Sheets

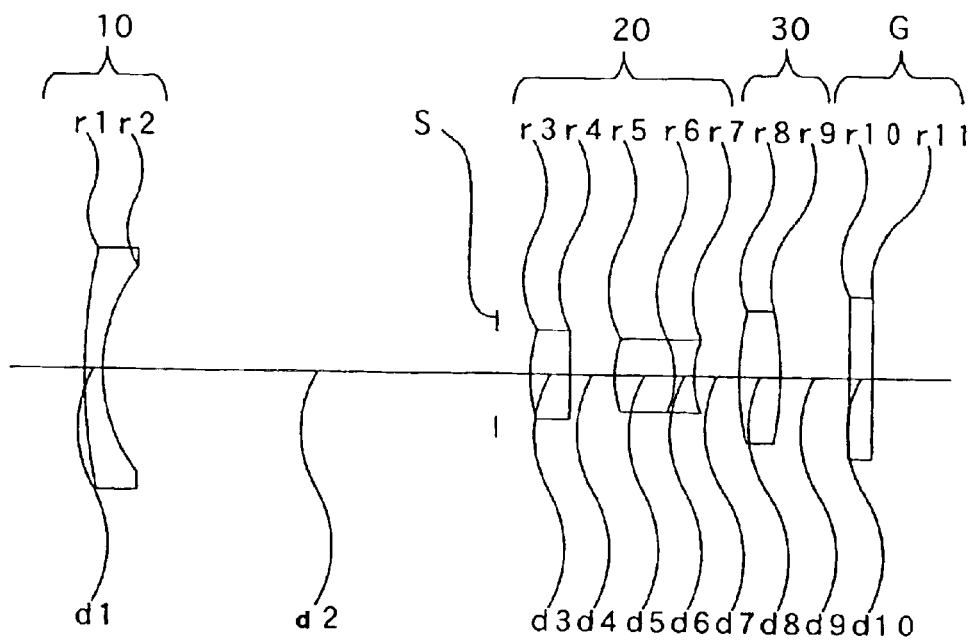
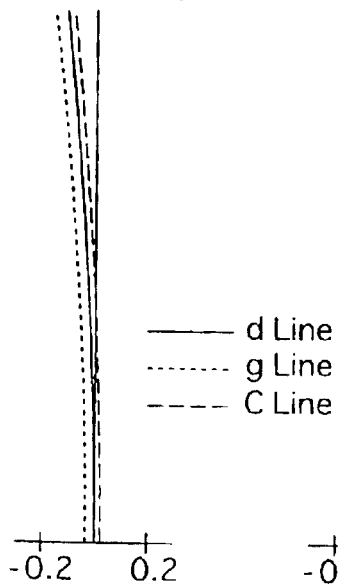
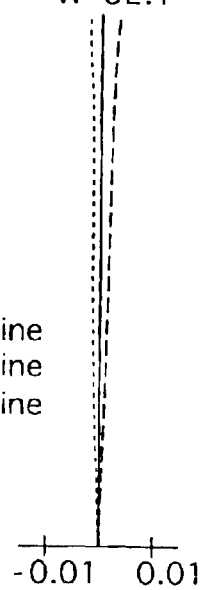
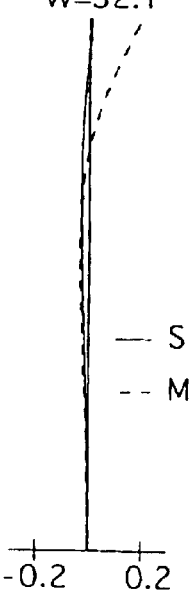
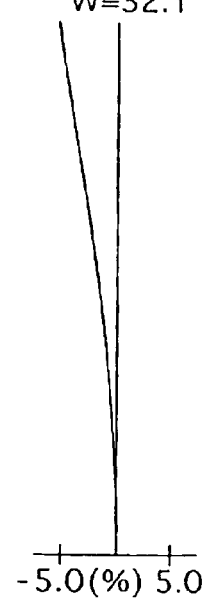

Fig. 3A    Fig. 3B    Fig. 3C    Fig. 3D
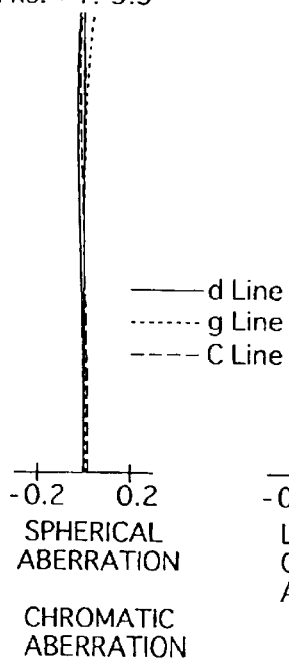
FNO.= 1: 3.9
—— d Line
······ g Line
---- C Line
-0.2   0.2
SPHERICAL
ABERRATION
CHROMATIC
ABERRATION
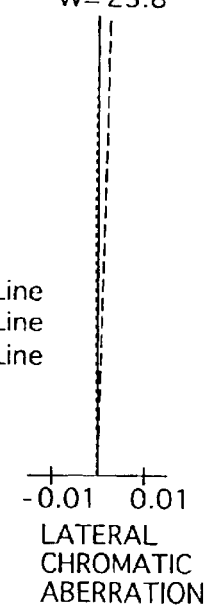
W= 23.8°
-0.01   0.01
LATERAL
CHROMATIC
ABERRATION
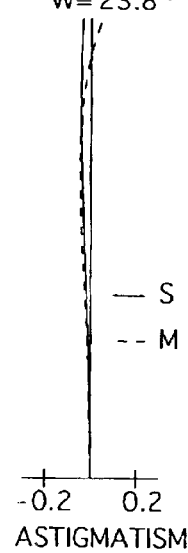
W= 23.8°
—— S
-- M
-0.2   0.2
ASTIGMATISM
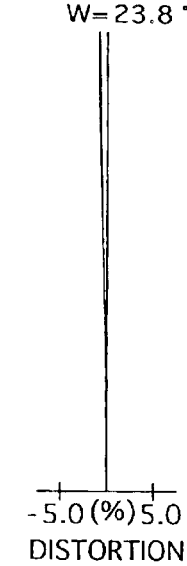
W= 23.8°
-5.0(%)5.0
DISTORTION
Fig. 4A    Fig. 4B    Fig. 4C    Fig. 4D
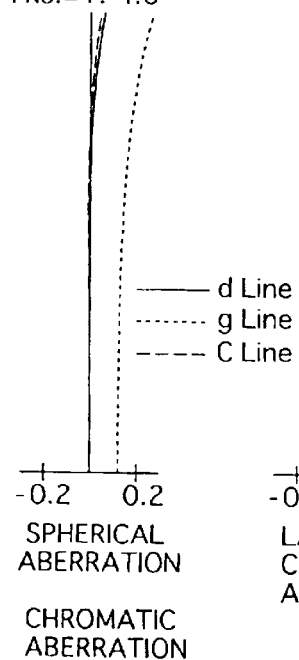
FNO.=1: 4.6
—— d Line
······ g Line
---- C Line
-0.2   0.2
SPHERICAL
ABERRATION
CHROMATIC
ABERRATION
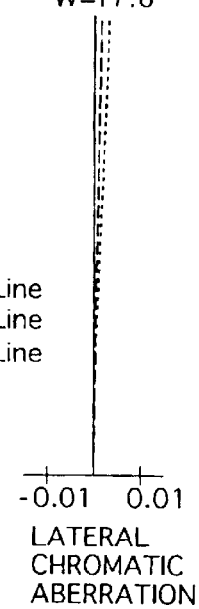
W=17.6°
-0.01   0.01
LATERAL
CHROMATIC
ABERRATION
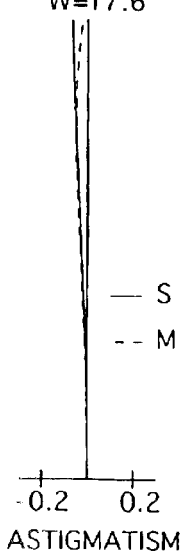
W=17.6°
—— S
-- M
-0.2   0.2
ASTIGMATISM
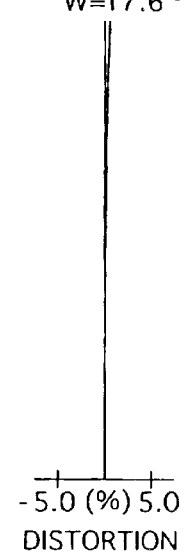
W=17.6°
-5.0 (%) 5.0
DISTORTION Fig. 5
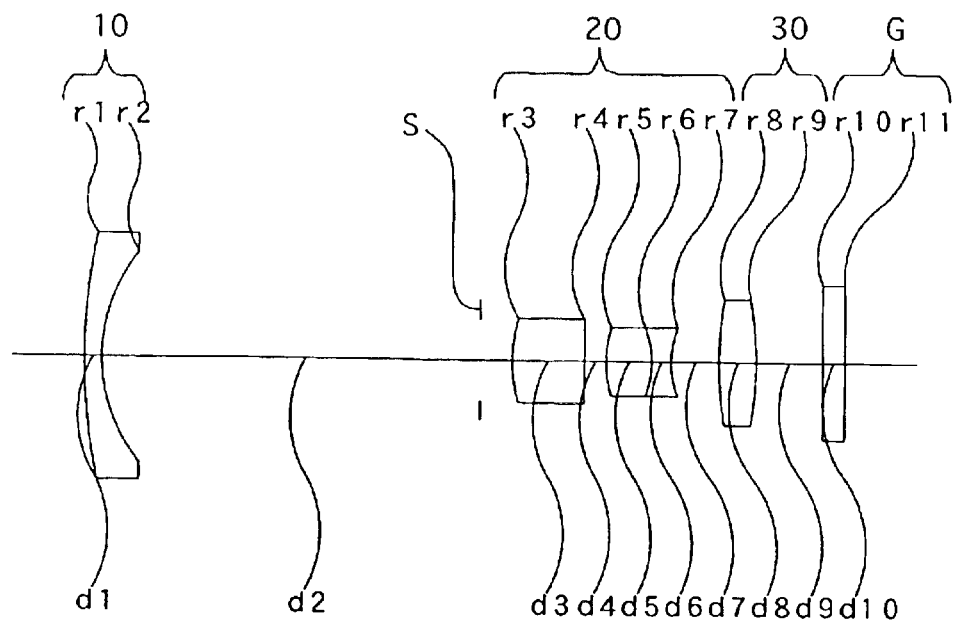
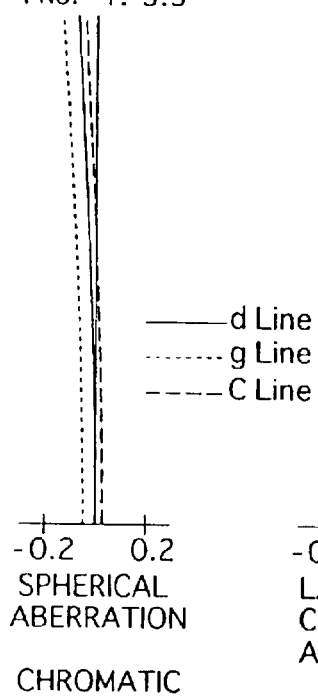
Fig. 6A
FNO.=1: 3.5
—— d Line
········· g Line
- - - - C Line
-0.2   0.2
SPHERICAL
ABERRATION
CHROMATIC
ABERRATION
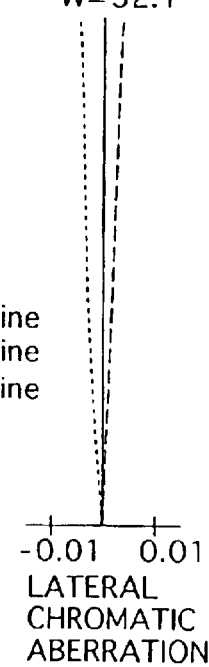
Fig. 6B
W=32.1°
-0.01   0.01
LATERAL
CHROMATIC
ABERRATION
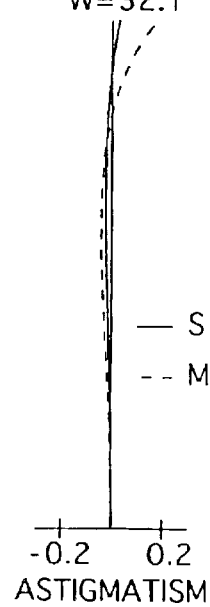
Fig. 6C
W=32.1°
—— S
- - M
-0.2   0.2
ASTIGMATISM
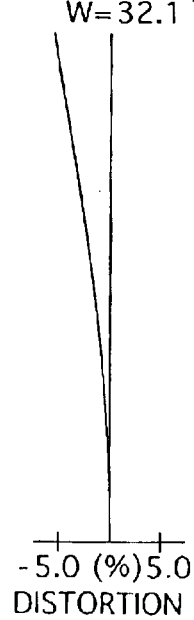
Fig. 6D
W=32.1°
-5.0 (%) 5.0
DISTORTION

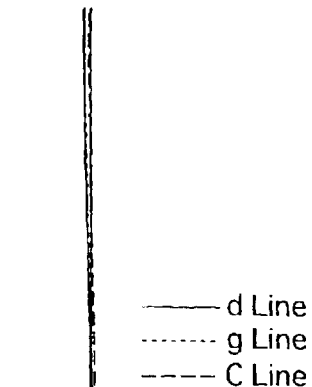
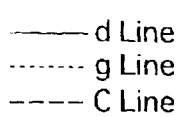
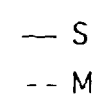
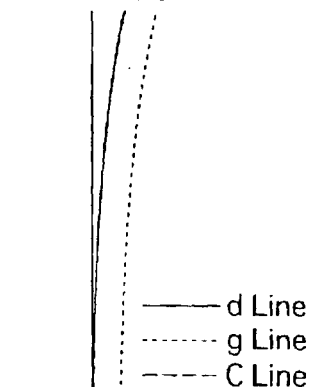
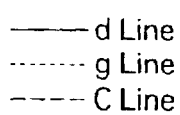
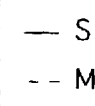

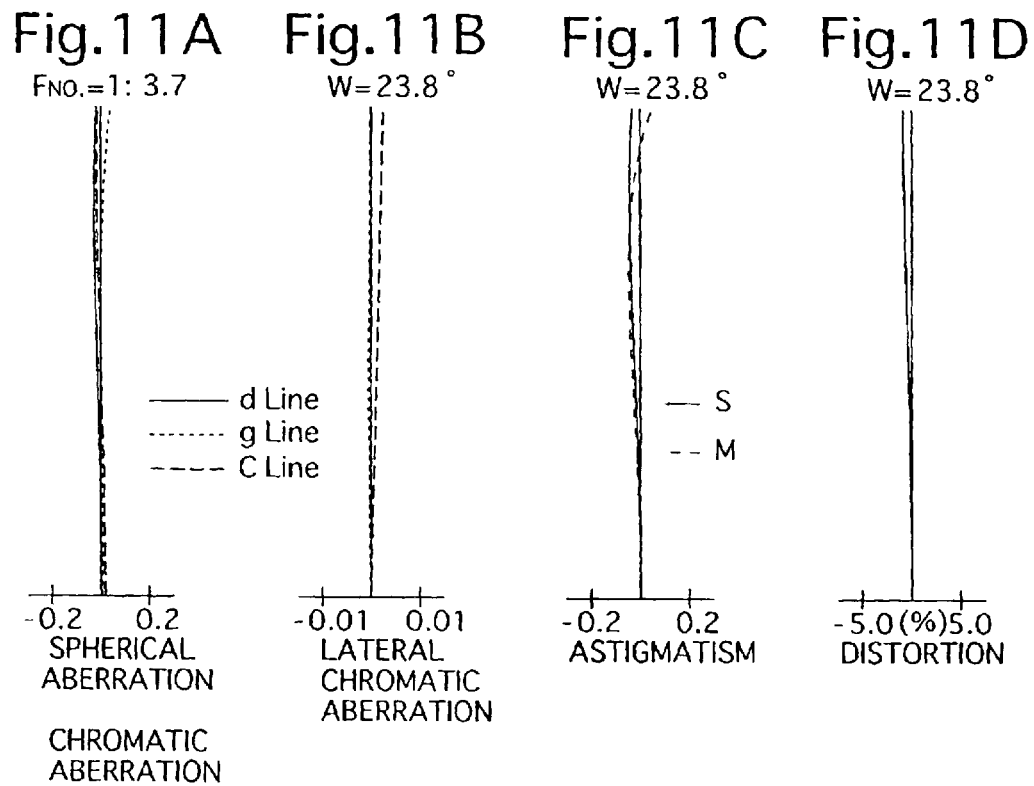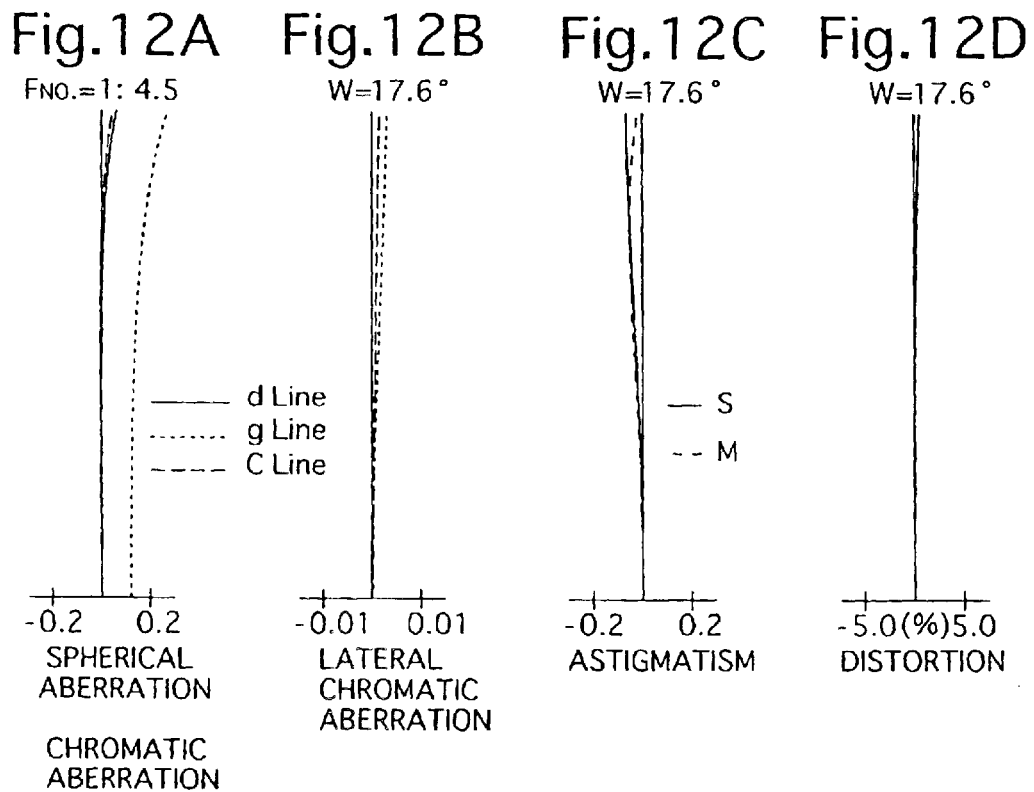

Fig. 13
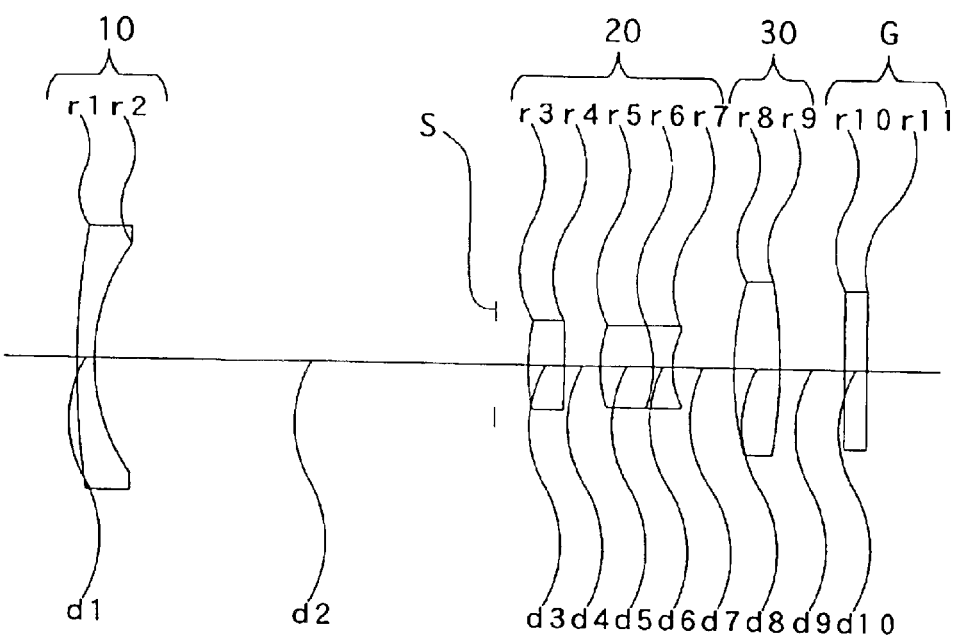
Fig.14A
F_{NO.}=1:3.1
Fig.14B
W=32.1°
Fig.14C
W=32.1°
Fig.14D
W=32.1°
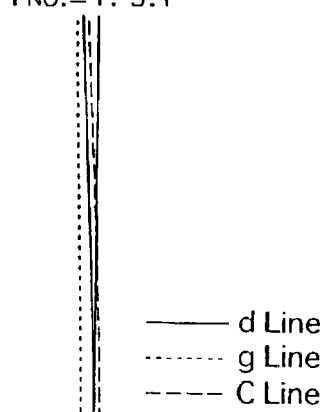
—— d Line
········ g Line
- - - C Line
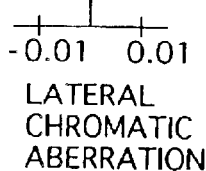
—— S
- - M
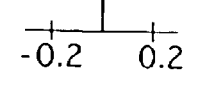
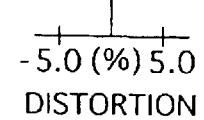
-0.2  0.2
SPHERICAL
ABERRATION
CHROMATIC
ABERRATION
-0.01  0.01
LATERAL
CHROMATIC
ABERRATION
-0.2  0.2
ASTIGMATISM
-5.0 (%) 5.0
DISTORTION

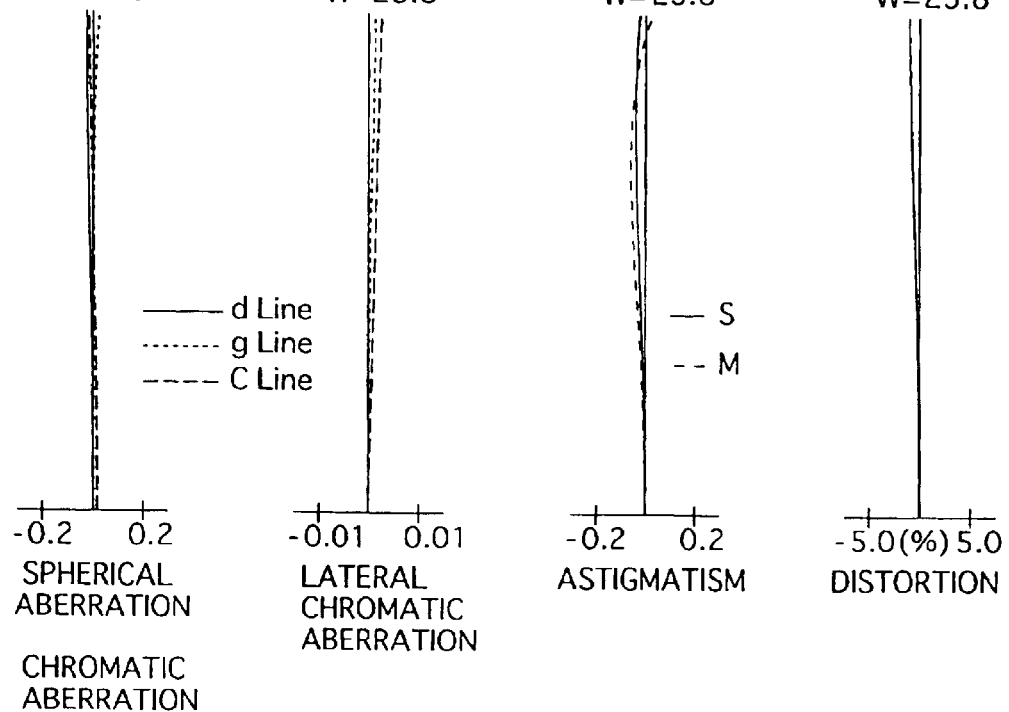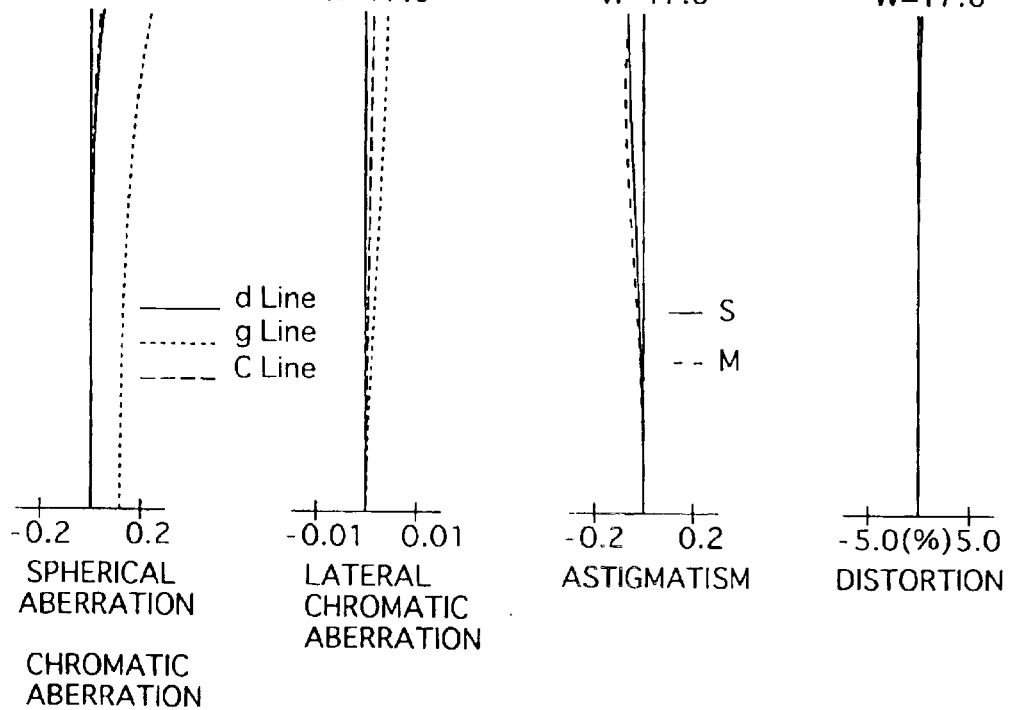

Fno.= 1:3.5

—— d Line
······ g Line
---- C Line

-0.2   0.2

SPHERICAL
ABERRATION

CHROMATIC
ABERRATION

W=32.1°

-0.01  0.01

LATERAL
CHROMATIC
ABERRATION

W=32.1°

—— S
-- M

-0.2   0.2

ASTIGMATISM

W=32.1°

-5.0 (%) 5.0

DISTORTION

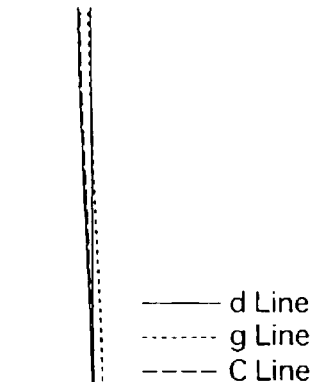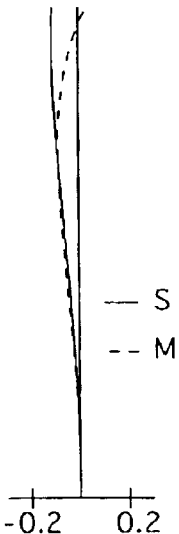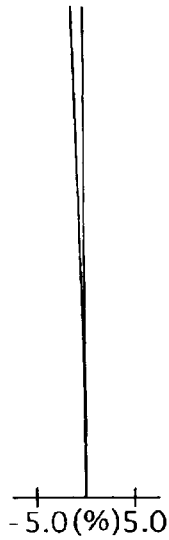
Fig.19A  Fig.19B  Fig.19C  Fig.19D
FNO.= 1: 3.9  W=23.9°  W=23.9°  W=23.9°
—— d Line
······ g Line
---- C Line
— S
-- M
-0.2  0.2    -0.01  0.01    -0.2  0.2    -5.0(%)5.0
SPHERICAL    LATERAL         ASTIGMATISM  DISTORTION
ABERRATION   CHROMATIC
             ABERRATION
CHROMATIC
ABERRATION
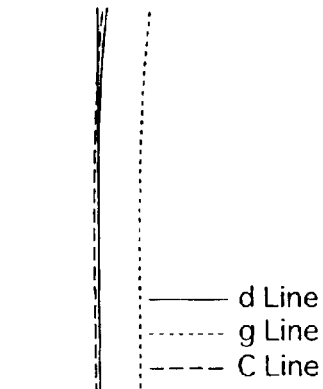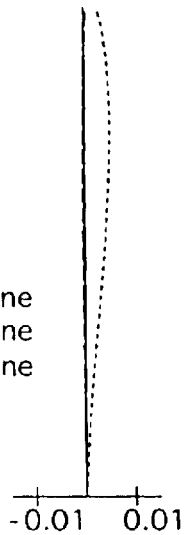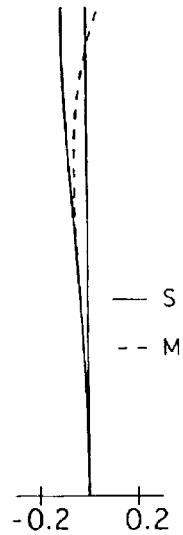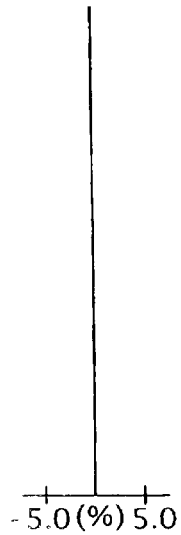
Fig.20A  Fig.20B  Fig.20C  Fig.20D
FNO.= 1: 4.5  W=17.7°  W=17.7°  W=17.7°
—— d Line
······ g Line
---- C Line
— S
-- M
-0.2  0.2    -0.01  0.01    -0.2  0.2    -5.0(%)5.0
SPHERICAL    LATERAL         ASTIGMATISM  DISTORTION
ABERRATION   CHROMATIC
             ABERRATION
CHROMATIC
ABERRATION Fig. 21
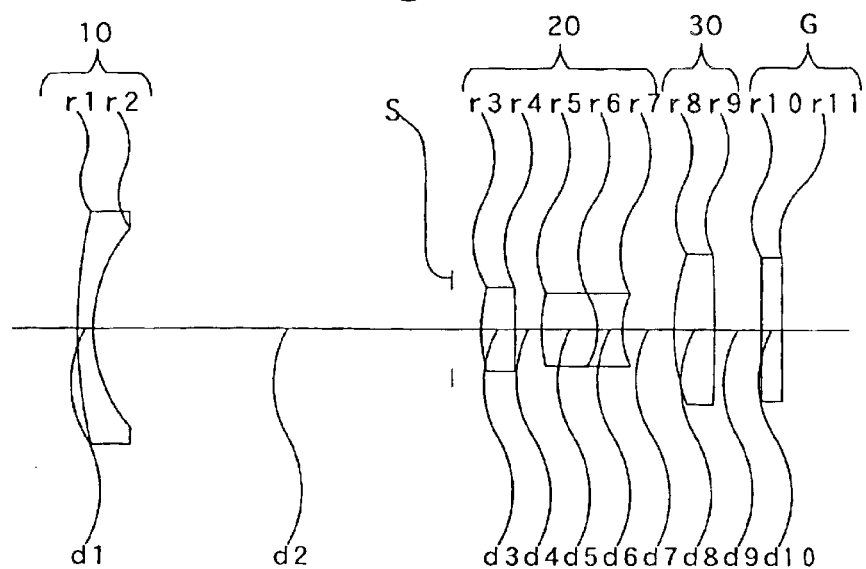
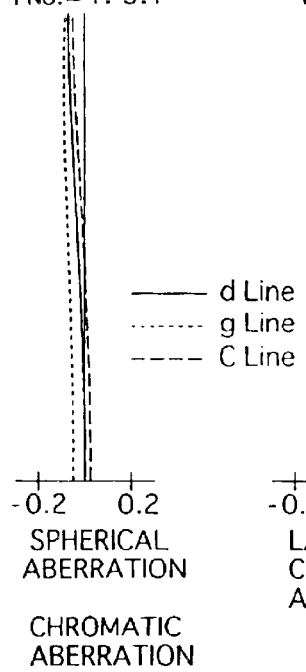
Fig.22A
F_{NO.}= 1: 3.1
— d Line
······ g Line
---- C Line
-0.2  0.2
SPHERICAL
ABERRATION
CHROMATIC
ABERRATION
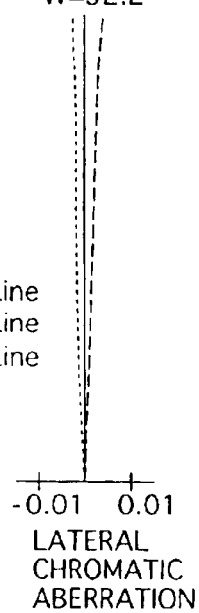
Fig.22B
W=32.2°
-0.01  0.01
LATERAL
CHROMATIC
ABERRATION
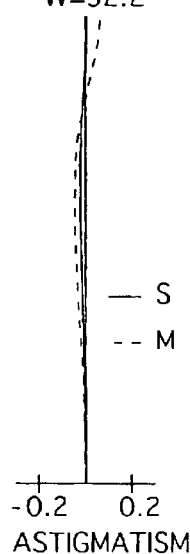
Fig.22C
W=32.2°
— S
-- M
-0.2  0.2
ASTIGMATISM
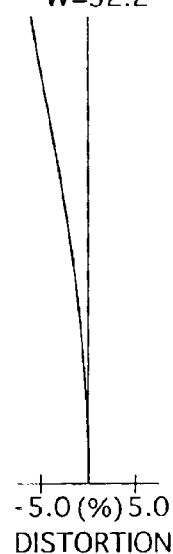
Fig.22D
W=32.2°
-5.0(%)5.0
DISTORTION

Fig.23A
FNO.= 1: 3.6
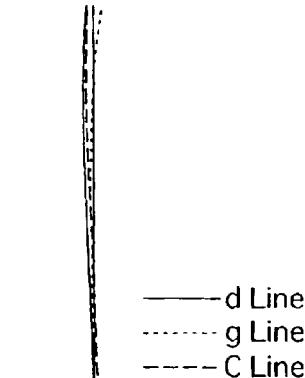
—— d Line
······ g Line
---- C Line
-0.2  0.2
SPHERICAL
ABERRATION
CHROMATIC
ABERRATION
Fig.23B
W=23.7°
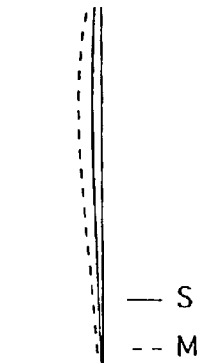
-0.01  0.01
LATERAL
CHROMATIC
ABERRATION
Fig.23C
W=23.7°
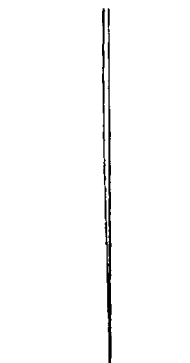
—— S
-- M
-0.2  0.2
ASTIGMATISM
Fig.23D
W=23.7°
-5.0(%)5.0
DISTORTION
Fig.24A
FNO.= 1: 4.4
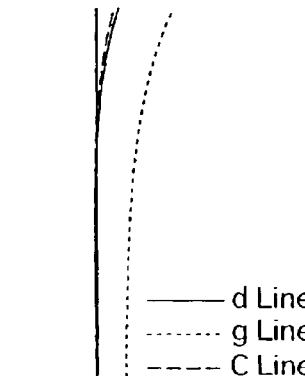
—— d Line
······ g Line
---- C Line
-0.2  0.2
SPHERICAL
ABERRATION
CHROMATIC
ABERRATION
Fig.24B
W=17.4°
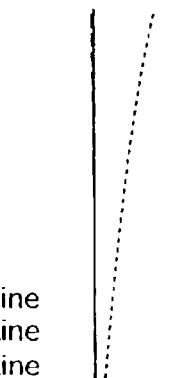
-0.01  0.01
LATERAL
CHROMATIC
ABERRATION
Fig.24C
W=17.4°
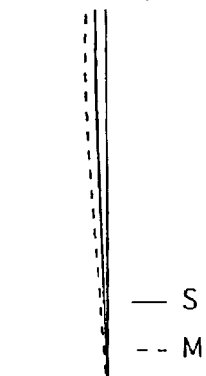
—— S
-- M
-0.2  0.2
ASTIGMATISM
Fig.24D
W=17.4°
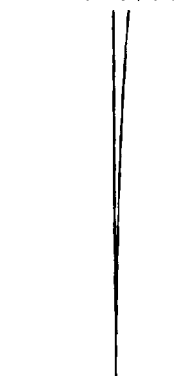
-5.0(%)5.0
DISTORTION

ZOOM LENS SYSTEM

BACKGROUND OF THE INVENTION

1. Field of the Invention

The present invention relates to a zoom lens system which is used in a small, light-weight video camera or a digital camera, etc., which has a half angle-of-view of 30° or more at the short focal length extremity, a zoom ratio of about 2, a simple structure, and which can be produced at low costs.

2. Description of the Prior Art

In recent years, along with further miniaturization of miniature imaging devices such as CCDs and higher density thereof, the zoom lens system used in a video camera and an electronic still camera or the like has also been required to reduce in size and to have an increased optical performance. Furthermore, in a solid-state image sensor used in such a video camera or electronic still camera, a color-separation filter is provided in the close vicinity of a light-receiving surface. Due to this arrangement, when a bundle of light rays passed through the photographing lens system is incident on the light-receiving surface at an inclined angle with respect to the light-receiving surface, the light is obscured (shaded) due to the color-separation filter. If shading occurs, such shading causes a decrease of peripheral illumination, and color irregularities occur due to deviation of the positional relationship between the color-separation filter and the pixels on the light-receiving surface. Accordingly, in order to attain 'optimum telecentricity', i.e., the bundle of light rays being incident on the light-receiving surface at an angle close to a right angle (90°) with respect to the light-receiving surface, an optical system in which the exit pupil is as far away from the image plane is required.

Furthermore, in recent years, in zoom a compact camera, although it is important for the camera to be smaller in a photographing position, compactness of the camera when the photographing lens system is retracted and is carried around has also become an important factor for further miniaturization. In other words, in such a zoom lens system, upon the photographing lens system is accommodated, i.e., when the photographing lens system is in the retracted position, a thin camera body is desirable. In order to achieve such a thin camera body, it is necessary to reduce the thickness of the lens groups constituting the zoom lens system, and to reduce the traveling distance of each lens group upon zooming for reducing mechanical burden.

As a miniature zoom lens system of the prior art, a two-lens-group zoom lens system constituted by a negative first lens group and a positive second lens group is known. However, in such a two-lens-group zoom lens system, the exit pupil position is relatively close to the image plane, which is not desirable for use with solid-state image sensor.

In order to solve the above-mentioned problem, as a zoom lens system having a smaller number lens elements and being produced at low costs, Japanese Unexamined Patent Publication (JUPP) Nos. 10-206732 and 11-211984 disclose the two-lens-group zoom lens system which has improved telecentricity by providing a stationary or movable positive lens group having a relatively strong refractive power between the second lens group and the imaging device.

In the two-lens-group zoom lens system taught in JUPP No. 10-206732, a zooming optical system is simply constituted by five lens elements. However, the zoom lens system disclosed therein has the following disadvantages:

(i) the aperture ratio at the short focal length extremity is large, i.e., 4 or more; and (ii) zooming is performed discontinuously, i.e., the zoom lens system is not arranged to perform continuous zooming.

Furthermore, the three-lens-group zoom lens system disclosed in JUPP No. 11-211984 achieves a zoom ratio of about 2 with a simple lens arrangement of the six lens elements. However, the half angle-of-view at the short focal length extremity is narrow, i.e., about 25°, and aspherical lens elements requiring high machining technology are employed in the first and third lens groups. Accordingly, the zoom lens system disclosed therein is not satisfactory from the viewpoint of a wider angle-of-view, and reducing costs; and the zoom lens system therefore still has room for improvement.

SUMMARY OF THE INVENTION

The present invention provides an inexpensive zoom lens system to be used in a small video camera or digital camera, etc.; and the zoom lens system has (i) a zoom ratio of about 2, (ii) an aperture ratio of about 1:3.5 at the short focal length extremity, (iii) a half angle-of-view of 30° or more at the short focal length extremity, (iv) sufficient optical performance for imaging onto a high-resolution imaging device, and (v) a simple structure without employing any special lens surfaces such as aspherical lens surfaces.

According to the present invention, there is provided a zoom lens system including a negative powered first lens group (hereinafter, a negative first lens group), a positive powered second lens group (hereinafter, a positive second lens group), and a positive powered third lens group (hereinafter, a positive third lens group), in this order from the object.

The negative first lens group includes a negative meniscus lens element having the convex surface facing toward the object, and the positive third lens group includes a positive biconvex lens element.

Upon zooming from the short focal length extremity to the long focal length extremity, at least the negative first lens group and the positive second lens group are moved.

A diaphragm is provided on the object side of the positive second lens group, and is arranged to move integrally therewith.

The zoom lens system satisfies the following conditions:

$$0.25 < R1/D1 < 0.55 \quad (1)$$

$$0.25 < f2/TL < 0.45 \quad (2)$$

wherein

R1 designates the radius of curvature of the image-side surface of the negative meniscus lens element, which constitutes the negative first lens group;

D1 designates the distance between the negative first lens group and the positive second lens group at the short focal length extremity;

f2 designates the focal length of the positive second lens group; and

TL designates the distance along the optical axis from the most object-side surface the negative first lens group to the most image-side surface of the positive third lens group, at the short focal length extremity.

The positive second lens group includes a positive lens element having a convex surface facing toward the object, and cemented lens elements having a positive lens element and a negative lens element, in this order from the object. The most image-side surface of the positive second lens group is formed as a divergent surface, and the zoom lens system preferably satisfies the following condition:

$$0.5 < R2/fw < 1.0 \quad (3)$$

wherein fw designates the focal length of the entire the zoom lens system at the short focal length extremity; and R2 designates the radius of curvature of the most image-side surface of the positive second lens group.

In the zoom lens system according to the present invention, there are the following two aspects with respect to the movement of the lens groups:

[The First Aspect]

Upon zooming from the short focal length extremity to the long focal length extremity, the negative first lens group monotonously moves toward the image, the positive second lens group monotonously moves toward the object, and the positive third lens group integrally moves with the positive second lens group.

In the first aspect, the zoom lens system preferably satisfies the following conditions:

$$2.2 < |f1/fw| < 3.0 \quad (4)$$

$$1.0 < f3/fw < 1.9 \quad (5)$$

wherein f1 designates the focal length of the negative first lens group;

f3 designates the focal length of the positive third lens group; and fw designates the focal length of the entire the zoom lens system at the short focal length extremity.

[The Second Aspect]

Upon zooming from the short focal length extremity to the long focal length extremity, the negative first lens group monotonously moves toward the image, the positive second lens group monotonously moves toward the object, and the positive third lens group is made immovable with respect to the image plane.

In the second aspect, the zoom lens system preferably satisfies the following conditions:

$$2.7 < |f1/fw| < 3.3 \quad (6)$$

$$1.7 < f3/fw < 2.3 \quad (7)$$

wherein f1 designates the focal length of the negative first lens group;

f3 designates the focal length of the positive third lens group; and fw designates the focal length of the entire the zoom lens system at the short focal length extremity.

The present disclosure relates to subject matter contained in Japanese Patent Application No. 2002-208509 (filed on Jul. 17, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of a zoom lens system according to a first embodiment of the present invention;

FIGS. 2A, 2B, 2C and 2D show aberrations occurred in the lens arrangement shown in FIG. 1 at the short focal length extremity,;

FIGS. 3A, 3B, 3C and 3D show aberrations occurred in the lens arrangement shown in FIG. 1 at an intermediate focal length;

FIGS. 4A, 4B, 4C and 4D show aberrations occurred in the lens arrangement shown in FIG. 1 at the long focal length extremity;

FIG. 5 is a lens arrangement of a zoom lens system according to a second embodiment of the present invention;

FIGS. 6A, 6B, 6C and 6D show aberrations occurred in the lens arrangement shown in FIG. 5 at the short focal length extremity,;

FIGS. 7A, 7B, 7C and 7D show aberrations occurred in the lens arrangement shown in FIG. 5 at an intermediate focal length;

FIGS. 8A, 8B, 8C and 8D show aberrations occurred in the lens arrangement shown in FIG. 5 at the long focal length extremity;

FIGS. 11A, 11B, 11C and 11D show aberrations occurred in the lens arrangement shown in FIG. 9 at an intermediate focal length;

FIGS. 12A, 12B, 12C and 12D show aberrations occurred in the lens arrangement shown in FIG. 9 at the long focal length extremity;

FIG. 13 is a lens arrangement of a zoom lens system according to a fourth embodiment of the present invention;

FIGS. 14A, 14B, 14C and 14D show aberrations occurred in the lens arrangement shown in FIG. 13 at the short focal length extremity,;

FIGS. 15A, 15B, 15C and 15D show aberrations occurred in the lens arrangement shown in FIG. 13 at an intermediate focal length;

FIGS. 16A, 16B, 16C and 16D show aberrations occurred in the lens arrangement shown in FIG. 13 at the long focal length extremity;

FIGS. 19A, 19B, 19C and 19D show aberrations occurred in the lens arrangement shown in FIG. 17 at an intermediate focal length;

FIGS. 20A, 20B, 20C and 20D show aberrations occurred in the lens arrangement shown in FIG. 17 at the long focal length extremity;

FIG. 21 is a lens arrangement of a zoom lens system according to a sixth embodiment of the present invention;

FIGS. 22A, 22B, 22C and 22D show aberrations occurred in the lens arrangement shown in FIG. 21 at the short focal length extremity,;

FIGS. 23A, 23B, 23C and 23D show aberrations occurred in the lens arrangement shown in FIG. 21 at an intermediate focal length;

FIGS. 24A, 24B, 24C and 24D show aberrations occurred in the lens arrangement shown in FIG. 21 at the long focal length extremity;

DESCRIPTION OF THE PREFERRED EMBODIMENTS

As shown in the lens arrangements of FIGS. 1, 5, 9, 13, 17 and 21, the zoom lens system according to the present invention includes a negative first lens group 10, a positive second lens group 20, and a positive third lens group 30, in this order from the object. Each lens arrangement indicates a zoom lens system for a digital camera to which the present invention is applied. The designator G represents a filter group having a low-pass filter, infrared-cut filter, and a CCD cover glass, etc., shown as a parallel-plane plate.

Figure 25:
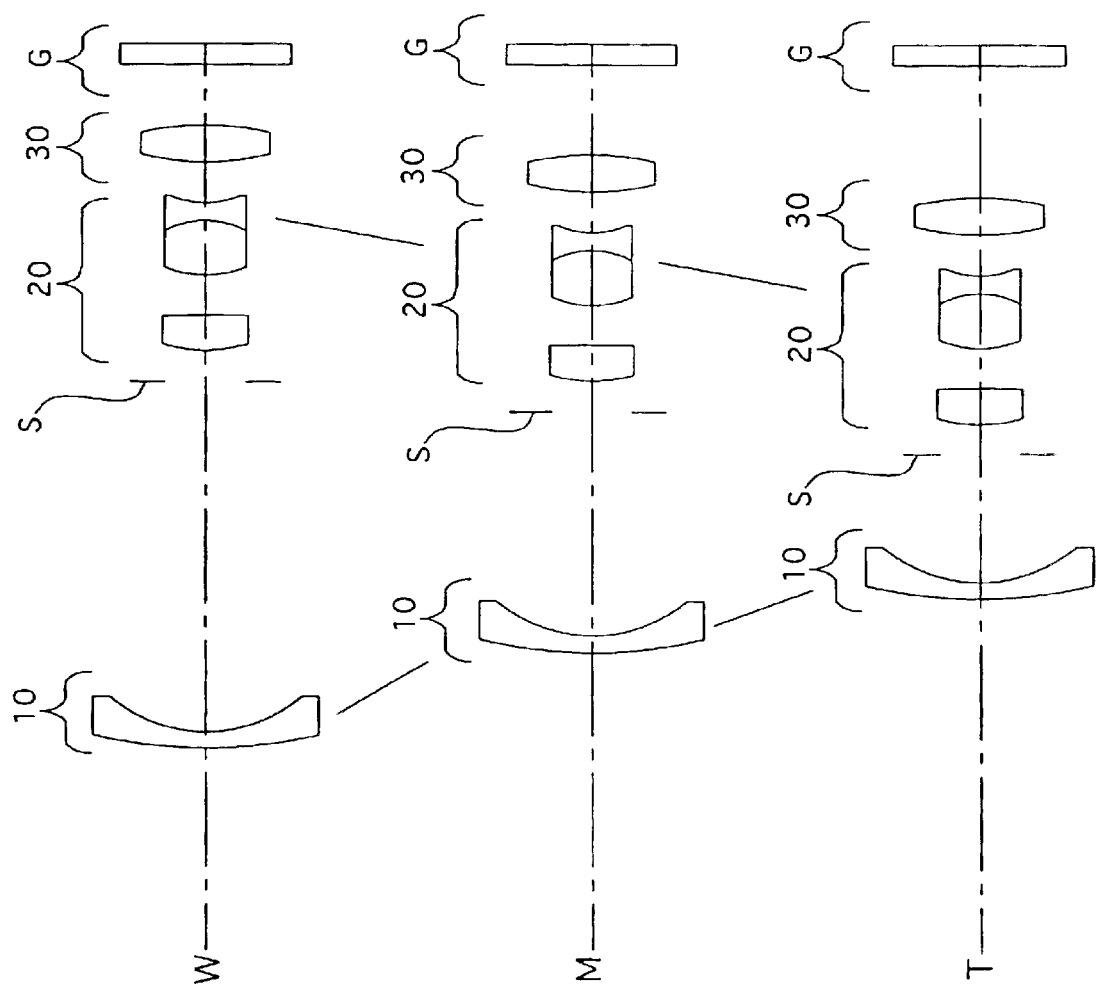
FIG. 25 shows a schematic lens-group moving paths of the zoom lens system according to the first, second and fifth embodiments.
Figure 26:
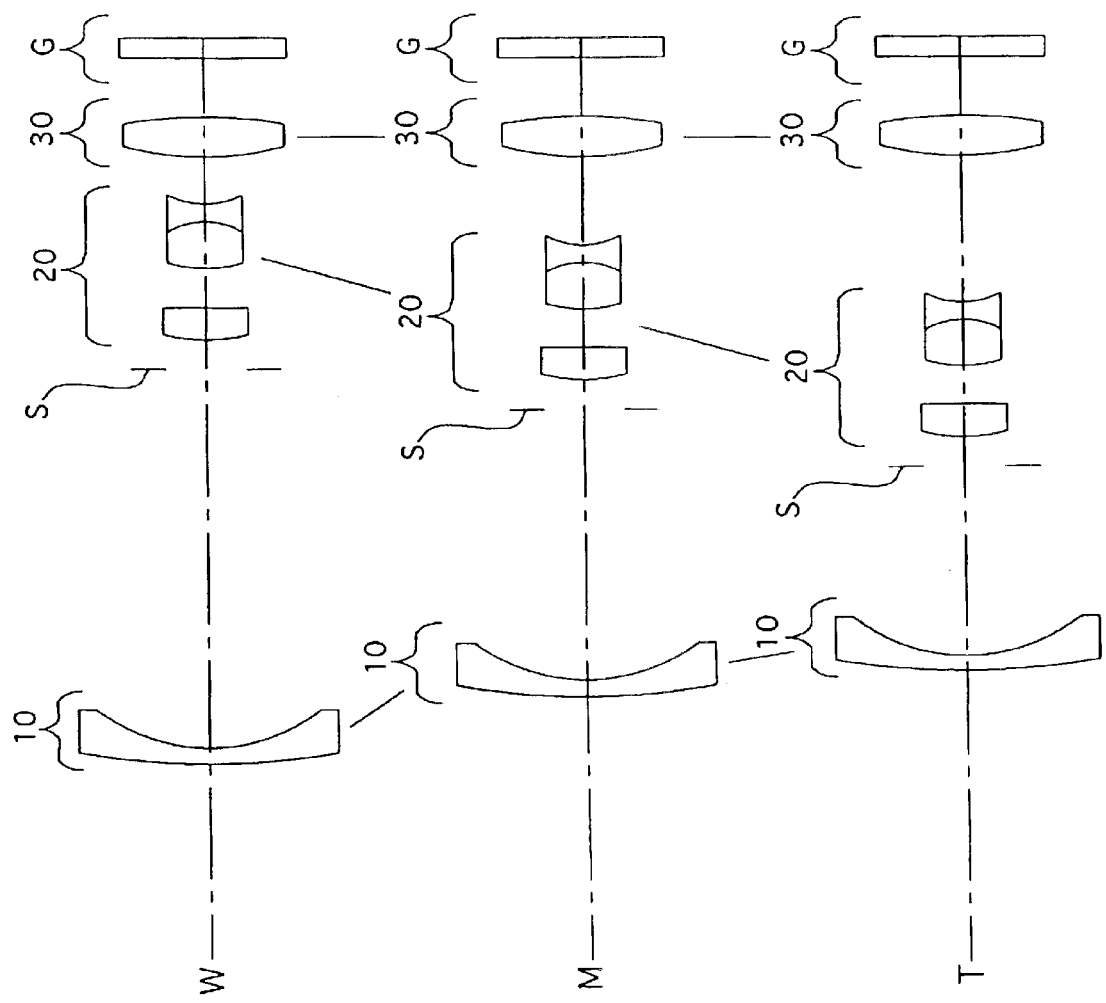
FIG. 26 shows a schematic lens-group moving paths of the zoom lens system according to the third, fourth and sixth embodiments.

FIGS. 25 and 26 show the two types of the schematic lens-group moving paths of the zoom lens system.

In FIG. 25, the positive second lens group 20 and the positive third lens group 30 are arranged to move integrally. More specifically, upon zooming from the short focal length extremity to the long focal length extremity, the negative first lens group 10 monotonously moves toward the image, from the short focal length extremity W via the intermediate focal length M to the long focal length extremity; the positive second lens group 20 and the positive third lens group 30 monotonously and integrally moves toward the object; and the diaphragm is provided between the negative first lens group 10 and the positive second lens group 20, and move integrally with the positive second lens group 20 upon zooming.

In FIG. 26, upon zooming, the negative first lens group 10 and the positive second lens group 20 are made movable, and the positive third lens group 30 is made immovable. More specifically, upon zooming from the short focal length extremity W to the long focal length extremity T, the negative first lens group monotonously moves toward the image; the positive second lens group monotonously moves toward the object; the positive third lens group is made immovable with respect to the image plane; and the diaphragm is provided between the negative first lens group 10 and the positive second lens group 20, and move integrally with the positive second lens group 20 upon zooming.

Condition (1) is for correcting aberrations by suitably setting the distance between the negative first lens group 10 and the positive second lens group 20, and setting the radius of curvature of the image-side surface of the negative meniscus lens element, in the case where the negative first lens group 10 is constituted by a negative meniscus lens element.

If the radius of curvature of the image-side surface of the negative meniscus lens element becomes too large (weak) with respect to the distance between the negative first lens group 10 and the positive second lens group 20 to the extent that R1/D1 exceeds the upper limit of condition (1), it becomes difficult to reduce distortion especially at the short focal length extremity, and it is difficult to reduce the overall length of the zoom lens system.

If the radius of curvature of the image-side surface of the negative meniscus lens element becomes too small (strong) with respect to the distance between the negative first lens group 10 and the positive second lens group 20 to the extent that R1/D1 exceeds the lower limit of condition (1), the power of the negative first lens group 10 becomes too large, so that coma increases, and it becomes difficult to correct field curvature at both the short focal length extremity and the long focal length extremity in a well-balanced manner.

Condition (2) specifies the ratio of the focal length of the positive second lens group 20 to the distance along the optical axis from the most object-side surface the negative first lens group 10 to the most image-side surface of the positive third lens group 30, at the short focal length extremity, i.e., the overall length of the zoom lens system. By appropriately distributing the positive power of the positive second lens group 20 so that condition (2) is satisfied, the balance between further miniaturization of the zoom lens system and the correcting of aberrations can be made suitably.

If the power of the positive second lens group 20 becomes too strong with respect to the overall length of the zoom lens system to the extent that f2/TL exceeds the lower limit of condition (2), field curvature largely inclines toward the negative direction.

If the power of the positive second lens group 20 becomes too weak with respect to the overall length of the zoom lens system to the extent that f2/TL exceeds the upper limit of condition (2), it becomes difficult to balance spherical aberration and field curvature while the overall length of the zoom lens system is maintained shorter.

In each embodiments as shown in FIGS. 1, 5, 9, 13, 17 and 21, the positive second lens group 20 includes three lens elements, i.e., a positive lens element having a convex surface facing toward the object, a positive biconvex lens element and a negative biconvex lens element, in this order from the object. Note that the positive biconvex lens element and the negative biconvex lens element are cemented.

In these embodiments, the positive second lens group 20 is the zoom lens group, and therefore has a strong power. Accordingly, in the case where the positive second lens group 20 is constituted by the three lens element as explained above, the second and third lens elements are preferably cemented. Due to this arrangement, deterioration of optical performance caused by manufacturing error can be prevented, and simple assembling work can be attained.

Furthermore, the most image-side surface of the positive second lens group is preferably formed as a strong divergent surface which satisfies condition (3). By forming the final surface of the positive second lens group 20 as a divergent surface, the bundle of light rays which exits from the second lens group 20 can be diverged from the optical axis over a relatively short distance between the positive second lens group 20 and the positive third lens group 30; and thereby suitable telecentricity can be achieved by effectively refracting the bundle of light rays via the third lens group 30.

If the radius of curvature of the final surface of the positive second lens group 20 becomes large, and the divergent power becomes too weak to the extent that R2/fw exceeds the upper limit of condition (3), it becomes necessary to increase the distance between the positive second lens group 20 and the positive third lens group 30 in order to attain suitable telecentricity. However, such an increase of the distance therebetween is undesirable with respect to reducing the overall length of the zoom lens system.

If the divergent power of the final surface of the positive second lens group 20 becomes too strong to the extent that R2/fw exceeds the lower limit of condition (3), the positive power of the positive third lens group 30 at the same time becomes too strong, so that the correcting of spherical aberration and coma becomes difficult.

Conditions (4) and (5) are for achieving an adequate optical performance in the case where the positive second lens group 20 and the positive third lens group 30 are integrally moved upon zooming, as shown in FIG. 25, i.e., the two-lens-group zoom lens system is constituted.

Condition (4) specifies the refractive power of the negative first lens group 10. By satisfying this condition, further miniaturization can be achieved, and the change in aberrations upon zooming can be adequately corrected.

If the negative refractive power of the negative first lens group 10 becomes too weak to the extent that |f1/fw| exceeds the upper limit of condition (4), it is advantageous for the correcting of aberrations. However, the overall length of the zoom lens system becomes longer, and accordingly the lens diameter increases, which are not desirable from the viewpoint of achieving further miniaturization.

If the negative refractive power of the negative first lens group 10 becomes too strong to the extent that |f1/fw| exceeds the lower limit of condition (4), the positive refractive power of the positive second lens group 20 becomes stronger, so that it is difficult to correct astigmatism and field curvature upon zooming in a well balanced manner.

Condition (5) specifies the refractive power of the positive third lens group 30. By satisfying this condition, the balance between adequate telecentricity at the short focal length extremity and the change in aberrations upon zooming can be achieved suitably.

If the refractive power of the positive third lens group 30 becomes too weak to the extent that f3/fw exceeds the upper limit of condition (5), the refractive power of the positive second lens group 20 becomes too strong at the same time, so that the change in aberrations upon zooming from the short focal length extremity to the long focal length extremity undesirably increases.

If the refractive power of the positive third lens group 30 becomes too strong to the extent that f3/fw exceeds the lower limit of condition (5), the refractive power of the positive third lens group 30 becomes too large. Consequently, the position of the exit pupil at the short focal length extremity is distant from the image plane, so that telecentricity improves. However, it becomes difficult to adequately correct spherical aberration and flatness of the image plane while the sufficient back focal distance is maintained.

Conditions (6) and (7) are for achieving an adequate optical performance in the case where upon zooming the negative first lens group 10 monotonously moves toward the image, the positive second lens group 20 monotonously moves toward the object, and the positive third lens group 30 is made immovable with respect to the image plane, as shown in FIG. 26. Since the positive third lens group 30 is positioned close to the image plane, further miniaturization of the driving system can be accomplished, particularly, in the case where the positive third lens group 30 is arranged to perform focusing.

Condition (6) specifies the refractive power of the negative first lens group 10. Similar to condition (4), by satisfying this condition, further miniaturization can be achieved, and the change in aberrations upon zooming can be adequately corrected.

If the negative refractive power of the negative first lens group 10 becomes too weak to the extent that |f1/fw| exceeds the upper limit of condition (6), it is advantageous for the correcting of aberrations. However, the overall length of the zoom lens system becomes longer, and accordingly the lens diameter increases, which are not desirable from the viewpoint of achieving further miniaturization.

If the negative refractive power of the negative first lens group 10 becomes too strong to the extent that |f1/fw| exceeds the lower limit of condition (6), the positive refractive power of the positive second lens group 20 becomes stronger, so that it is difficult to correct astigmatism and field curvature upon zooming in a well balanced manner.

Condition (7) specifies the refractive power of the positive third lens group 30. By satisfying this condition, adequate telecentricity at the short focal length extremity can be obtained, and the change in aberrations upon focusing from infinity to an object at a closer distance can be reduced.

If the refractive power of the positive third lens group 30 becomes too weak to the extent that f3/fw exceeds the upper limit of condition (7), telecentricity at the short focal length extremity deteriorates, and the traveling distance of the positive third lens group 30 upon focusing becomes too long. In particular, it becomes difficult to reduce the change in aberrations at the long focal length extremity.

If the refractive power of the positive third lens group 30 becomes too strong to the extent that f3/fw exceeds the lower limit of condition (7), the change in the exit pupil position upon zooming from the short focal length extremity to the long focal length extremity becomes undesirably too large. Moreover, it becomes difficult to adequately correct astigmatism while the sufficient back focal distance is maintained.

Specific numerical data of the embodiments will be described hereinafter. In the diagrams of chromatic aberration (axial chromatic aberration) represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FNO designates the f-number, f designates the focal length of the entire zoom lens system, fB designates the back focal distance (the distance from the most image-side surface of the cover glass to the image plane), W designates the half angle-of-view (°), r designates the radius of curvature, d designates the lens-element thickness or distance between lens elements, $N_d$ designates the refractive index of the d-line, and $v_d$ designates the Abbe number.

[Embodiment 1]

FIG. 1 is the lens arrangement of a zoom lens system according to the first embodiment of the present invention. FIGS. 2A through 2D show aberrations occurred in the lens arrangement shown in FIG. 1 at the short focal length extremity. FIGS. 3A through 3D show aberrations occurred in the lens arrangement shown in FIG. 1 at an intermediate focal length. FIGS. 4A through 4D show aberrations occurred in the lens arrangement shown in FIG. 1 at the long focal length extremity. FIG. 25 shows the schematic lens-group moving paths of the zoom lens system according to the first embodiment. Table 1 shows the numerical data of the first embodiment.

The negative first lens group 10 includes a negative meniscus lens element having the convex surface facing toward the object.

The positive second lens group 20 includes three lens elements, i.e., a positive biconvex lens element, and cemented lens elements having a positive biconvex lens element and a negative biconcave lens element, in this order from the object.

The positive third lens group includes a positive biconvex lens element.

Upon zooming each lens group moves as shown in the schematic lens-group moving paths shown in FIG. 25.

TABLE 1

FNO. = 1: 3.5–3.9–4.6
f = 5.90–8.00–11.00 (Zoom Ratio: 1.86)
W = 32.1–23.8–17.6
fB = 0.00—0.00—0.00
D2 = 18.66–12.51–7.80
D9 = 3.00–4.45–6.51
Diaphragm Position on the object side
from Surface No. 3: 1.50 1.50 1.50

| Surface No. | r | d | Nd | $\nu_d$ |
|---|---|---|---|---|
| 1 | 24.171 | 0.80 | 1.75500 | 52.3 |
| 2 | 7.308 | D2 | — | — |
| 3 | 7.330 | 1.73 | 1.80400 | 46.6 |
| 4 | −104.489 | 1.95 | — | — |
| 5 | 5.255 | 2.68 | 1.48749 | 70.2 |
| 6 | −4.234 | 0.88 | 1.80518 | 25.4 |
| 7 | 4.226 | 2.02 | — | — |
| 8 | 13.114 | 1.81 | 1.72825 | 28.5 |
| 9 | −14.339 | D9 | — | — |
| 10 | ∞ | 1.00 | 1.51633 | 64.1 |
| 11 | ∞ | — | — | — |

[Embodiment 2]

FIG. 5 is the lens arrangement of a zoom lens system according to the second embodiment of the present invention. FIGS. 6A through 6D show aberrations occurred in the lens arrangement shown in FIG. 5 at the short focal length extremity. FIGS. 7A through 7D show aberrations occurred in the lens arrangement shown in FIG. 5 at an intermediate focal length. FIGS. 8A through 8D show aberrations occurred in the lens arrangement shown in FIG. 5 at the long focal length extremity. Table 2 shows the numerical data of the second embodiment. The basic lens arrangement of the second embodiment is the same as the first embodiment, and upon zooming each lens group likewise moves according to the schematic lens-group moving paths of FIG. 25.

TABLE 2

FNO. = 1: 3.5–3.9–4.5
f = 5.90–8.00–11.00 (Zoom Ratio: 1.86)
W = 32.1–23.8–17.6
fB = 0.00—0.00—0.00
D2 = 18.79–12.57–7.80
D9 = 3.00–4.40–6.40
Diaphragm Position on the object side
from Surface No. 3: 1.50 1.50 1.50

| Surface No. | r | d | Nd | $\nu_d$ |
|---|---|---|---|---|
| 1 | 27.104 | 0.80 | 1.72916 | 54.7 |
| 2 | 7.508 | D2 | — | — |
| 3 | 6.860 | 3.33 | 1.88300 | 40.8 |
| 4 | −249.107 | 1.00 | — | — |
| 5 | 5.236 | 2.10 | 1.48749 | 70.2 |
| 6 | −4.256 | 0.90 | 1.84666 | 23.8 |
| 7 | 4.256 | 2.20 | — | — |
| 8 | 16.569 | 1.73 | 1.84666 | 23.8 |
| 9 | −16.569 | D9 | — | — |
| 10 | ∞ | 1.00 | 1.51633 | 64.1 |
| 11 | ∞ | — | — | — |

[Embodiment 3]

Figure 9:
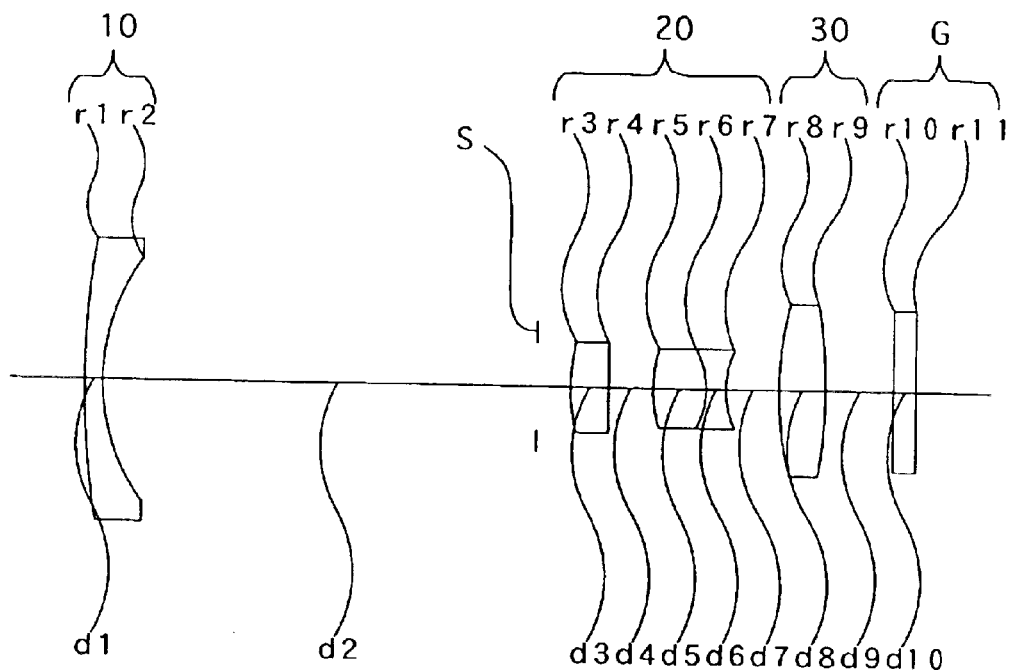
FIG. 9 is a lens arrangement of a zoom lens system according to a third embodiment of the present invention.
Figures 10A, 10B, 10C, 10D:
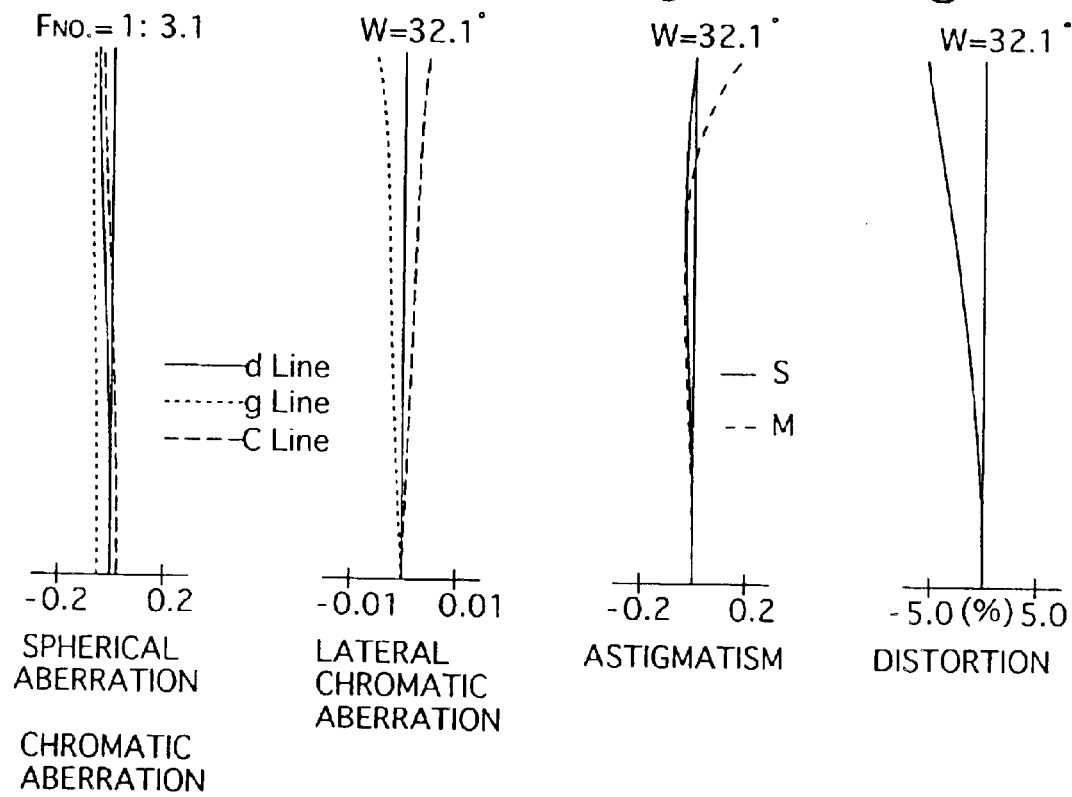
FIGS. 10A, 10B, 10C and 10D show aberrations occurred in the lens arrangement shown in FIG. 9 at the short focal length extremity.

FIG. 9 is the lens arrangement of a zoom lens system according to the third embodiment of the present invention. FIGS. 10A through 10D show aberrations occurred in the lens arrangement shown in FIG. 9 at the short focal length extremity. FIGS. 1A through 11D show aberrations occurred in the lens arrangement shown in FIG. 9 at an intermediate focal length. FIGS. 12A through 12D show aberrations occurred in the lens arrangement shown in FIG. 9 at the long focal length extremity. FIG. 26 shows the schematic lens-group moving paths of the zoom lens system according to the third embodiment. Table 3 shows the numerical data of the third embodiment.

The negative first lens group 10 includes a negative meniscus lens element having the convex surface facing toward the object.

The positive second lens group 20 includes three lens elements, i.e., a positive biconvex lens element, and cemented lens elements having a positive biconvex lens element and a negative biconcave lens element, in this order from the object.

The positive third lens group includes a positive biconvex lens element.

Upon zooming each lens group moves as shown in the schematic lens-group moving paths shown in FIG. 26.

TABLE 3

FNO. = 1: 3.1–3.7–4.5
f = 5.90–8.00–11.00 (Zoom Ratio: 1.86)
W = 32.1–23.8–17.6
fB = 0.00—0.00—0.00
D2 = 20.66–15.22–11.05
D7 = 2.40–4.46–7.40
Diaphragm Position on the object side
from Surface No. 3: 1.50 1.50 1.50

| Surface No. | r | d | Nd | $\nu_d$ |
|---|---|---|---|---|
| 1 | 38.407 | 0.80 | 1.67790 | 55.3 |
| 2 | 9.228 | D2 | — | — |
| 3 | 8.440 | 1.67 | 1.86300 | 41.5 |
| 4 | −926.220 | 1.95 | — | — |
| 5 | 6.494 | 2.33 | 1.70154 | 41.2 |
| 6 | −3.799 | 0.90 | 1.80518 | 25.4 |
| 7 | 4.022 | D7 | — | — |
| 8 | 15.274 | 2.04 | 1.83400 | 37.2 |
| 9 | −23.522 | 3.01 | — | — |
| 10 | ∞ | 1.00 | 1.51633 | 64.1 |
| 11 | ∞ | — | — | — |

[Embodiment 4]

FIG. 13 is the lens arrangement of a zoom lens system according to the fourth embodiment of the present invention. FIGS. 14A through 14D show aberrations occurred in the lens arrangement shown in FIG. 13 at the short focal length extremity. FIGS. 15A through 15D show aberrations occurred in the lens arrangement shown in FIG. 13 at an intermediate focal length. FIGS. 16A through 16D show aberrations occurred in the lens arrangement shown in FIG. 13 at the long focal length extremity. Table 4 shows the numerical data of the fourth embodiment. The basic lens arrangement of the fourth embodiment is the same as the third embodiment, and upon zooming, each lens group likewise moves according to the schematic lens-group moving paths of FIG. 26.

TABLE 4

FNO. = 1: 3.1–3.7–4.5
f = 5.90–8.00–11.00 (Zoom Ratio: 1.86)
W = 32.1–23.8–17.6
fB = 0.00—0.00—0.00
D2 = 19.73–14.64–10.73
D7 = 2.80–4.97–8.07
Diaphragm Position on the object side
from Surface No. 3: 1.50 1.50 1.50

| Surface No. | r | d | Nd | $\nu_d$ |
|---|---|---|---|---|
| 1 | 37.235 | 0.80 | 1.69680 | 55.5 |
| 2 | 9.079 | D2 | — | — |
| 3 | 9.795 | 1.62 | 1.83400 | 37.2 |

TABLE 4-continued

FNO. = 1: 3.1–3.7–4.5
f = 5.90–8.00–11.00 (Zoom Ratio: 1.86)
W = 32.1–23.8–17.6
fB = 0.00—0.00—0.00
D2 = 19.73–14.64–10.73
D7 = 2.80–4.97–8.07
Diaphragm Position on the object side
from Surface No. 3: 1.50 1.50 1.50

| Surface No. | r | d | Nd | $\nu_d$ |
|---|---|---|---|---|
| 4 | −63.740 | 1.63 | — | — |
| 5 | 5.700 | 2.45 | 1.72000 | 42.0 |
| 6 | −5.700 | 0.90 | 1.84666 | 23.8 |
| 7 | 3.720 | D7 | — | — |
| 8 | 15.202 | 2.07 | 1.88300 | 40.8 |
| 9 | −25.289 | 3.00 | — | — |
| 10 | ∞ | 1.00 | 1.51633 | 64.1 |
| 11 | ∞ | — | — | — |

[Embodiment 5]

Figure 17:
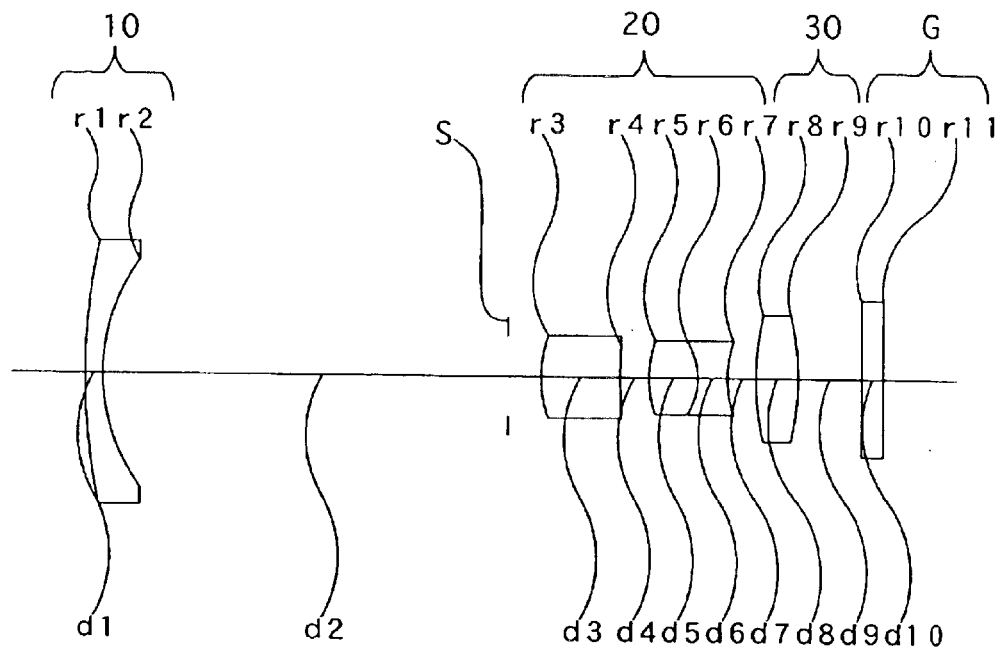
FIG. 17 is a lens arrangement of a zoom lens system according to a fifth embodiment of the present invention.
Figure 18A:
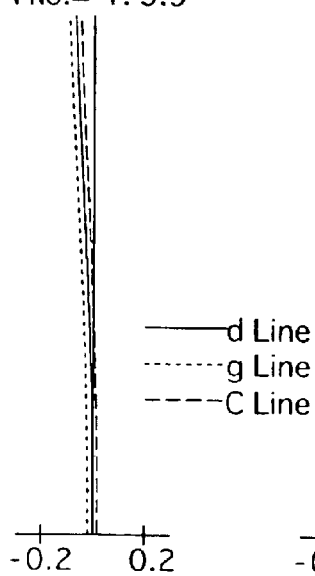
FIGS. 18A, 18B, 18C and 18D show aberrations occurred in the lens arrangement shown in FIG. 17 at the short focal length extremity.
Figure 18B:
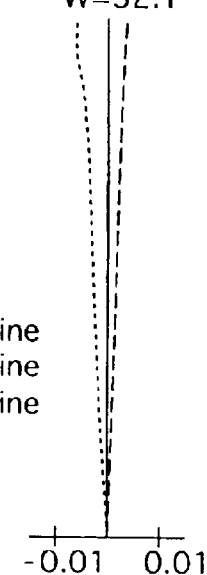
Figure 18C:
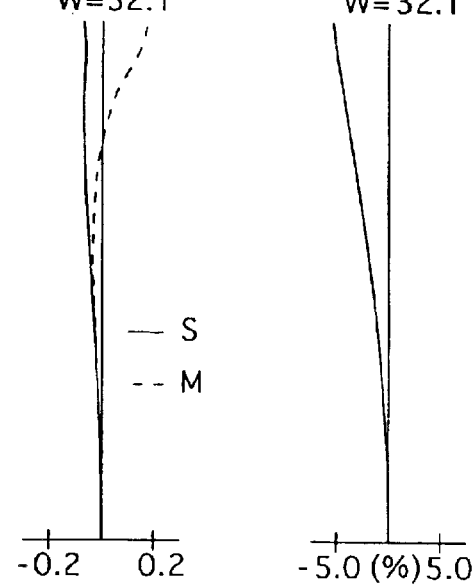
Figure 18D:
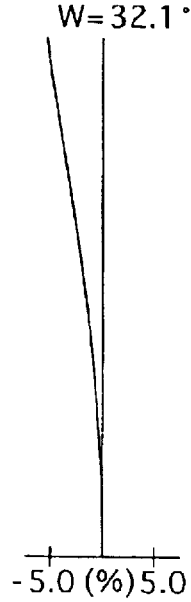

FIG. 17 is the lens arrangement of a zoom lens system according to the fifth embodiment of the present invention. FIGS. 18A through 18D show aberrations occurred in the lens arrangement shown in FIG. 17 at the short focal length extremity. FIGS. 19A through 19D show aberrations occurred in the lens arrangement shown in FIG. 17 at an intermediate focal length. FIGS. 20A through 20D show aberrations occurred in the lens arrangement shown in FIG. 17 at the long focal length extremity. Table 5 shows the numerical data of the fifth embodiment. The basic lens arrangement of the fifth embodiment is the same as the first embodiment, and upon zooming, each lens group likewise moves according to the schematic lens-group moving paths of FIG. 25.

TABLE 5

FNO. = 1: 3.5–3.9–4.5
f = 5.90–8.00–11.00 (Zoom Ratio: 1.86)
W = 32.1–23.9–17.7
fB = 0.00—0.00—0.00
D2 = 19.74–12.64–7.21
D7 = 2.85–4.09–5.86
Diaphragm Position on the object side
from Surface No. 3: 1.50 1.50 1.50

| Surface No. | r | d | Nd | $\nu_d$ |
|---|---|---|---|---|
| 1 | 27.915 | 0.80 | 1.77250 | 49.6 |
| 2 | 8.615 | D2 | — | — |
| 3 | 5.823 | 3.50 | 1.84100 | 43.2 |
| 4 | 21.343 | 1.30 | — | — |
| 5 | 5.194 | 2.21 | 1.48749 | 70.2 |
| 6 | −3.119 | 1.30 | 1.84666 | 23.8 |
| 7 | 5.287 | 1.29 | — | — |
| 8 | 12.645 | 1.86 | 1.84666 | 23.8 |
| 9 | −12.290 | D7 | — | — |
| 10 | ∞ | 1.00 | 1.51633 | 64.1 |
| 11 | ∞ | — | — | — |

[Embodiment 6]

FIG. 21 is the lens arrangement of a zoom lens system according to the sixth embodiment of the present invention. FIGS. 22A through 22D show aberrations occurred in the lens arrangement shown in FIG. 21 at the short focal length extremity. FIGS. 23A through 23D show aberrations occurred in the lens arrangement shown in FIG. 21 at an intermediate focal length. FIGS. 24A through 24D show aberrations occurred in the lens arrangement shown in FIG. 21 at the long focal length extremity. Table 6 shows the numerical data of the sixth embodiment. The basic lens arrangement of the sixth embodiment is the same as the third embodiment, and upon zooming, each lens group likewise moves according to the schematic lens-group moving paths of FIG. 26.

TABLE 6

FNO. = 1: 3.1–3.6–4.4
f = 5.90–8.00–11.00 (Zoom Ratio: 1.86)
W = 32.2–23.7–17.4
fB = 0.00—0.00—0.00
D2 = 19.40–14.42–10.60
D7 = 2.57–4.44–7.1
Diaphragm Position on the object side
from Surface No. 3: 1.43 1.43 1.43

| Surface No. | r | d | Nd | $\nu_d$ |
|---|---|---|---|---|
| 1 | 25.081 | 0.80 | 1.67790 | 55.3 |
| 2 | 7.723 | D2 | — | — |
| 3 | 8.218 | 1.66 | 1.86300 | 41.5 |
| 4 | −97.675 | 1.33 | — | — |
| 5 | 8.004 | 2.85 | 1.70154 | 41.2 |
| 6 | −3.311 | 1.24 | 1.80518 | 25.4 |
| 7 | 4.248 | D7 | — | — |
| 8 | 11.215 | 2.04 | 1.83400 | 37.2 |
| 9 | −89.227 | 2.33 | — | — |
| 10 | ∞ | 1.00 | 1.51633 | 64.1 |
| 11 | ∞ | — | — | — |

Table 7 shows the numerical values of each condition for each embodiment.

TABLE 7

| | Embod. 1 | Embod. 2 | Embod. 3 | Embod. 4 | Embod. 5 | Embod. 6 |
|---|---|---|---|---|---|---|
| Cond. (1) | 0.392 | 0.400 | 0.447 | 0.460 | 0.436 | 0.398 |
| Cond. (2) | 0.325 | 0.320 | 0.334 | 0.340 | 0.324 | 0.313 |
| Cond. (3) | 0.716 | 0.721 | 0.682 | 0.631 | 0.896 | 0.720 |
| Cond. (4) | 2.401 | 2.456 | — | — | 2.798 | — |
| Cond. (5) | 1.640 | 1.699 | — | — | 1.219 | — |
| Cond. (6) | — | — | 3.071 | 2.955 | — | 2.843 |
| Cond. (7) | — | — | 1.928 | 1.867 | — | 2.044 |

As can be understood from Table 7, the numerical values of the first through sixth embodiments satisfy conditions (1) and (7), and as can be understood from the drawings, the various aberrations at each focal length have been adequately corrected.

According to the above description, an inexpensive zoom lens system to be used in a small video camera or digital camera, etc., can be obtained; and the zoom lens system has (i) a zoom ratio of approximately 2, (ii) an aperture ratio of approximately 1:3.5 at the short focal length extremity, (iii) a half angle-of-view of at least 30° at the short focal length extremity, (iv) sufficient optical performance of imaging onto a high resolution imaging device, and (v) a simple structure without employing any special lens surfaces such as aspherical lens surfaces.

What is claimed is:

1. A zoom lens system comprising a negative first lens group, a positive second lens group, and a positive third lens group, in this order from an object,
   wherein said negative first lens group consists of a negative meniscus lens element having the convex surface facing toward said object, and said positive third lens group comprises a positive biconvex lens element;
   wherein upon zooming from the short focal length extremity to the long focal length extremity, at least said negative first lens group and said positive second lens group are moved;

wherein a diaphragm is provided on the object side of said positive second lens group, and moves integrally therewith; and wherein said zoom lens system satisfies the following conditions:

$$0.25 < R1/D1 < 0.55$$

$$0.25 < f2/TL < 0.45$$

wherein

R1 designates the radius of curvature of the image-side surface of said negative meniscus lens element, which constitutes said negative first lens group;

D1 designates the distance between said negative first lens group and said positive second lens group at the short focal length extremity;

f2 designates the focal length of said positive second lens group; and

TL designates the distance along the optical axis from the most object-side surface of said negative first lens group to the most image-side surface of said positive third lens group, at the short focal length extremity.

2. The zoom lens system according to claim 1, wherein said positive second lens group comprises a positive lens element having a convex surface facing toward said object, and cemented lens elements having a positive lens element and a negative lens element, in this order from said object, wherein the most image-side surface of said positive second lens group comprises a divergent surface; and wherein the zoom lens system satisfies the following condition:

$$0.5 < R2/fw < 1.0$$

wherein fw designates the focal length of the entire the zoom lens system at the short focal length extremity; and R2 designates the radius of curvature of the most image-side surface of said positive second lens group.

3. The zoom lens system according to claim 1, wherein upon zooming from the short focal length extremity to the long focal length extremity, said negative first lens group monotonously moves toward an image, said positive second lens group monotonously moves toward said object, and said positive third lens group integrally moves with said positive second lens group; and wherein said zoom lens system satisfies the following conditions:

$$2.2 < |f1/fw| < 3.0$$

$$1.0 < f3/fw < 1.9$$

wherein f1 designates the focal length of said negative first lens group;

f3 designates the focal length of said positive third lens group; and fw designates the focal length of the entire the zoom lens system at the short focal length extremity.

4. The zoom lens system according to claim 1, wherein upon zooming from the short focal length extremity to the long focal length extremity, said negative first lens group monotonously moves toward said image, said positive second lens group monotonously moves toward said object, and said positive third lens group is made immovable with respect to the image plane; and wherein said zoom lens system satisfies the following conditions:

$$2.7 < |f1/fw| < 3.3$$

$$1.7 < f3/fw < 2.3$$

wherein f1 designates the focal length of said negative first lens group;

f3 designates the focal length of said positive third lens group; and fw designates the focal length of the entire the zoom lens system at the short focal length extremity.

5. A zoom lens system comprising a negative first lens group, a positive second lens group, and a positive third lens group, in this order from an object, wherein said negative first lens group comprises a negative meniscus lens element having the convex surface facing toward said object, and said positive third lens group comprises a positive biconvex lens element;

wherein upon zooming from the short focal length extremity to the long focal length extremity, said negative first lens group monotonously moves toward said image, said positive second lens group monotonously moves toward said object, and said positive third lens group is made immovable with respect to the image plane;

wherein a diaphragm is provided on the object side of said positive second lens group, and moves integrally therewith; and wherein said zoom lens system satisfies the following conditions:

$$0.25 < R1/D1 < 0.55$$

$$0.25 < f2/TL < 0.45$$

$$2.7 < |f1/fw1 < 3.3$$

$$1.7 < f3/fw < 2.3$$

wherein

R1 designates the radius of curvature of the image-side surface of said negative meniscus lens element, which constitutes said negative first lens group;

D1 designates the distance between said negative first lens group and said positive second lens group at the short focal length extremity;

TL designates the distance along the optical axis from the most object-side surface of said negative first lens group to the most image-side surface of said positive third lens group, at the short focal length extremity;

f1 designates the focal length of said negative first lens group;

f2 designates the focal length of said positive second lens group;

f3 designates the focal length of said positive third lens group; and fw designates the focal length of the entire the zoom lens system at the short focal length extremity.

6. The zoom lens system according to claim 5, wherein said positive second lens group comprises a positive lens element having a convex surface facing toward said object, and cemented lens elements having a positive lens element and a negative lens element, in this order from said object,
   wherein the most image-side surface of said positive second lens group comprises a divergent surface; and
   wherein the zoom lens system satisfies the following condition:

$$0.5 < R2/fw < 1.0$$

wherein
   R2 designates the radius of curvature of the most image-side surface of said positive second lens group.

* * * * *